Patented Dec. 13, 1932

1,890,948

UNITED STATES PATENT OFFICE

RICHARD PASTERNACK AND RICHARD W. BURNHAM, OF BROOKLYN, NEW YORK, ASSIGNORS TO CHARLES PFIZER & COMPANY, OF BROOKLYN, NEW YORK, A CORPORATION OF NEW JERSEY

CHEESE AND METHOD OF PROCESSING SAME

No Drawing.  Application filed June 13, 1930. Serial No. 461,041.

This invention relates to cheese and the method of processing same and more particularly to emulsifying agents adapted for use in processing cheese.

Most of the cheeses found on the market today have been processed. This processing comprises giving the cheese a heat treatment at a temperature high enough to destroy undesirable bacteria but not high enough to disintegrate the cheese. Generally the cheese is kept at a temperature from about 140° F. to 175° F. for half an hour or so. This processing sterilizes the cheese, greatly reducing its tendency to decay, and furthermore, improves the texture and appearance of the cheese. In some cases different kinds of cheeses are blended in this processing to give a cheese of improved flavor and more uniform and homogeneous texture. Also, in the case of Camembert, Brie, and other cheeses of extremely soft consistency, it is advantageous to blend a firmer cheese with the soft cheese to obtain a cheese of firmer character which can be more conveniently packed and served on the table.

In this processing of cheese, the cheese is reduced to a more or less plastic state and the fat constituent of the cheese in this state has a tendency to separate out and thereby ruin the uniform texture of the finished cheese. This tendency has heretofore been overcome by constantly stirring the cheese and adding to it a small amount of an emulsifying agent. In this manner, a finished cheese is obtained of uniform and homogeneous texture.

Disodium phosphate, Rochelle salts, and trisodium citrate have been commonly used as emulsifying agents for this purpose. These salts, as well as others proposed for this purpose, have not proved satisfactory because they slowly form insoluble calcium salts by reaction with the calcium caseinate in the cheese, and, in the course of time, definite crystalline aggregates of these insoluble calcium salts separate from the cheese, producing a most undesirable grit in the finished cheese.

We have now discovered that soluble derivatives of gluconic acid, including the salts of gluconic acid such as the sodium, ammonium, potassium, and calcium salts, are particularly suited for use as emulsifying agents in the processing of cheese.

These derivatives of gluconic acid have all the advantageous properties of the salts heretofore used for this purpose, and, furthermore, the very material added advantage that they do not form insoluble calcium salts. Processed cheeses in which these derivatives of gluconic acid have been used as the emulsifying agent retain their smooth, homogeneous texture indefinitely and do not develop the undesirable grit common to cheeses processed with phosphates, tartrates, citrates and the like, nor is the flavor of the finished cheese impaired.

Cheese may be processed using gluconates in the same manner cheeses are now processed using phosphates, tartrates, citrates, etc. as emulsifying agents, for example, by putting cheese or a mixture of cheeses through an ordinary meat grinder, at the same time feeding into the mixture a soluble gluconate and about 0.5% of sodium chloride by weight of the cheese, the gluconate and chloride being dissolved in sufficient water to give the finished cheese a water content of 40%, 3% more water being introduced at this point to compensate for loss due to evaporation in the processing to follow. The ground mixture is then passed through a colander to give it greater uniformity and then placed in a steam jacketed kettle equipped with an eccentric motion agitator, the temperature raised to about 160° F. and the agitator run rapidly for five minutes, at the end of which time the emulsification of the cheese is complete. The agitator is slowed down and the temperature of about 160° F. maintained for fifteen minutes longer to effect satisfactory sterilization. The gluconates are used in proportions ranging from 0.1% to 5.0% by weight of the cheese, 0.5% to 2.0% by weight of the cheese being the usual proportion.

The invention claimed is:

1. A product comprising sterilized cheese and a soluble gluconate.

2. The method of processing cheese comprising adding to the cheese a small proportion of a soluble salt of gluconic acid, heating the mass to a temperature high enough to destroy undesirable bacteria contained in the cheese but not sufficiently high to disintegrate the cheese, and maintaining the temperature until the cheese is sterilized.

3. The method of processing cheese comprising mixing two or more kinds of cheese together, adding to the mixture a small proportion of a soluble salt of gluconic acid, heating the mass to a temperature high enough to destroy undesirable bacteria contained in the cheese but not sufficiently high to disintegrate the cheese, and maintaining the temperature until the cheese is sterilized.

4. A product comprising sterilized cheese and calcium gluconate.

5. A product comprising sterilized cheese and potassium gluconate.

6. A product comprising sterilized cheese and ammonium gluconate.

7. A product comprising sterilized cheese and from 0.1% to 5.0% by weight of a soluble gluconate.

8. A product comprising sterilized cheese and from 0.1% to 5.0% by weight of a salt selected from the group consisting of sodium, potassium, ammonium and calcium gluconates.

9. The method of processing cheese comprising adding to the cheese a small proportion of calcium gluconate, heating the mass to a temperature high enough to destroy undesirable bacteria contained in the cheese but not sufficiently high to disintegrate the cheese, and maintaining the temperature until the cheese is sterilized.

10. The method of processing cheese comprising adding to the cheese a small proportion of potassium gluconate, heating the mass to a temperature high enough to destroy undesirable bacteria contained in the cheese but not sufficiently high to disintegrate the cheese, and maintaining the temperature until the cheese is sterilized.

11. The method of processing cheese comprising adding to the cheese a small proportion of ammonium gluconate, heating the mass to a temperature high enough to destroy undesirable bacteria contained in the cheese but not sufficiently high to disintegrate the cheese, and maintaining the temperature until the cheese is sterilized.

Signed at Brooklyn, in the county of Kings and State of New York, this 11th day of June A. D. 1930.

RICHARD PASTERNACK.
RICHARD W. BURNHAM.

DISCLAIMER 1,890,948.—*Richard Pasternack* and *Richard W. Burnham,* Brooklyn, N. Y. CHEESE AND METHOD OF PROCESSING SAME. Patent dated December 13, 1932. Disclaimer filed October 24, 1934, by the assignee, *Charles Pfizer & Company,* the patentees, assenting, ratifying, and confirming.

Hereby disclaims from said Letters Patent claims 1, 2, 3, 4, and 9 thereof as follows:

"1. A product comprising sterilized cheese and a soluble gluconate.

"2. The method of processing cheese comprising adding to the cheese a small proportion of a soluble salt of gluconic acid, heating the mass to a temperature high enough to destroy undesirable bacteria contained in the cheese but not sufficiently high to disintegrate the cheese, and maintaining the temperature until the cheese is sterilized.

"3. The method of processing cheese comprising mixing two or more kinds of cheese together, adding to the mixture a small proportion of a soluble salt of gluconic acid, heating the mass to a temperature high enough to destroy undesirable bacteria contained in the cheese but not sufficiently high to disintegrate the cheese, and maintaining the temperature until the cheese is sterilized.

"4. A product comprising sterilized cheese and calcium gluconate."

"9. The method of processing cheese comprising adding to the cheese a small proportion of calcium gluconate, heating the mass to a temperature high enough to destroy undesirable bacteria contained in the cheese but not sufficiently high to disintegrate the cheese, and maintaining the temperature until the cheese is sterilized."

[*Official Gazette November 20, 1934.*]